(12) United States Patent
Gammel et al.

(10) Patent No.: US 6,212,056 B1
(45) Date of Patent: Apr. 3, 2001

(54) MICROMACHINED VARIABLE CAPACITOR

(75) Inventors: Peter Ledel Gammel, Millburn; James Albert Walker, Howell, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/280,804

(22) Filed: Mar. 26, 1999

(51) Int. Cl.$^7$ .................... H01G 5/00; H01G 7/00
(52) U.S. Cl. .................... 361/277; 361/278; 361/280
(58) Field of Search ................... 361/271, 277, 361/278–282, 283.1–283.3, 283.4, 287, 290, 291, 300

(56) References Cited

U.S. PATENT DOCUMENTS

| | | | |
|---|---|---|---|
| 4,196,632 | * | 4/1980 | Sikorra .................... 73/718 |
| 4,203,128 | * | 5/1980 | Guckel et al. .................... 331/156 |
| 4,814,845 | * | 3/1989 | Kutrtz .................... 73/724 |
| 5,277,068 | * | 1/1994 | Fukiura et al. .................... 73/724 |
| 5,383,364 | * | 1/1995 | Takahasi et al. .................... 73/514.32 |
| 5,594,171 | * | 1/1997 | Ishida et al. .................... 73/514.32 |
| 5,636,099 | * | 6/1997 | Sugawara et al. .................... 361/278 |
| 5,901,031 | * | 5/1999 | Ishige et al. .................... 361/277 |

OTHER PUBLICATIONS

"Tunable Capacitors with Programmable Capacitance–Voltage Characteristic" by E.S. Hung et al, Solid–State Sensor and Actuator Workshop, Hilton Head Island, SC, Jun. 8–11, 1998, pp. 292–295.

"A Micromachined Variable capacitor for Monolithic Low–Noise VCOS" by D.J. Young et al, Solid–State Sensor & Actuator Workship, Hilton Head, SC, Jun. 2–6, 1996, pp. 86–89.

* cited by examiner

Primary Examiner—Kristine Kincaid
Assistant Examiner—Eric Thomas
(74) Attorney, Agent, or Firm—Lucian C. Canepa

(57) ABSTRACT

First and second wafers are micromachined by standard integrated-circuit fabrication techniques to respectively make first and second component parts of a variable capacitor. A thin flexible membrane in the first wafer is integral with and mechanically supported by the first wafer. A metal pattern on the first wafer includes a first capacitor plate on the membrane. In the second wafer, a well is formed. A metal pattern on the second wafer includes a second capacitor plate in the well. By bonding the two parts together face-to-face, the capacitor plates are positioned in spaced-apart alignment with each other. External electrical connections to the plates are made via bonding-pad portions of the metal patterns on the wafers. In response to electrical control signals, the metal plate on the membrane can be moved toward the other plate, thereby selectively changing the capacitance of the assembly.

12 Claims, 5 Drawing Sheets

MICROMACHINED VARIABLE CAPACITOR

TECHNICAL FIELD

This invention relates to microminiature electronic components and, more particularly, to a micromachined variable capacitor.

BACKGROUND OF THE INVENTION

Microminiature capacitors whose capacitance values can be controllably varied are used in a variety of applications of practical importance. Thus, for example, voltage-controlled capacitors (varactors) are employed as tunable components in circuits such as voltage-controlled oscillators. They are also used as discrete tunable elements in filters and loaded-line phase shifters.

Micromachining techniques have been utilized to fabricate very small variable capacitors for high-frequency use. (See, for example, "A Micromachined Variable Capacitor For Monolithic Low-Noise VCOS" by Young and Boser, Solid-State Sensor and Actuator Workshop, Hilton Head, S.C., Jun. 2–6, 1996, pages 86–89.) But heretofore it has proven difficult, if not impossible, to micromachine a variable capacitor that exhibits a sufficiently high quality factor (Q) and a wide enough tuning range to satisfy the requirements of some important high-frequency applications. In some such applications, operation in the gigaHertz range with a monotonic capacitance-versus-voltage characteristic and a high Q (1000 or higher) may be specified. Furthermore, in some such cases, a wide tuning range (for example, 0.1-to-5 picoFarads) may be required.

Accordingly, continuing efforts have been directed by workers skilled in the art aimed at trying to provide an improved microminiature variable capacitor. In particular, these efforts have focussed on attempting to provide a reliable, low-cost micromachined variable capacitor exhibiting advantageous characteristics such as linearity, high Q and a wide tuning range. It was recognized that these efforts, if successful, could provide an improved variable capacitor for use in a variety of practical high-frequency applications.

SUMMARY OF THE INVENTION

In accordance with the principles of the present invention, a first wafer is processed by standard integrated-circuit fabrication techniques to form therein a flexible membrane that is integral with and mechanically supported by the wafer. A metal pattern, comprising a capacitor plate on the flexible membrane and an associated electrical connection thereto, is then defined on the wafer. A second wafer is processed by standard integrated-circuit fabrication techniques to form in the surface thereof a well with a flat bottom and sloped walls. A metal pattern, comprising a capacitor plate on the bottom of the well and an associated electrical connection thereto extending up one sloped wall of the well, is then defined on the second wafer. Subsequently, the two wafers are bonded together, with the respective capacitor plates thereon positioned in facing alignment with each other to form a parallel-plate capacitor with an air-gap between the plates. Applying a control signal to the electrical connections that respectively extend to the capacitor plates causes the plates to be electrostatically attracted to each other. The flexible membrane and the capacitor plate thereon are thereby moved toward the other plate, which controllably changes the air-gap between the plates and thus varies the capacitance of the element.

In another specific illustrative embodiment of the present invention, separate control and signal plates are fabricated on the aforementioned membrane on the first wafer. Corresponding control and signal plates are formed on the bottom of the well in the second wafer. The air-gap between the control plates may be chosen to be considerably greater (for example, three times greater) than that between the signal plates. In operation, the membrane is flexed and the control plate thereon is thereby moved over a limited and stable region of the air-gap distance between the control plates. At the same time, the signal plates are thereby able to be moved over substantially the entire extent of the distance therebetween without incurring any instability of operation.

BRIEF DESCRIPTION OF THE DRAWING

A complete understanding of the present invention and of the above and other features and advantages thereof may be gained from a consideration of the following detailed description presented hereinbelow in connection with the accompanying drawing, not drawn to scale, in which.

DETAILED DESCRIPTION

Figure 1:
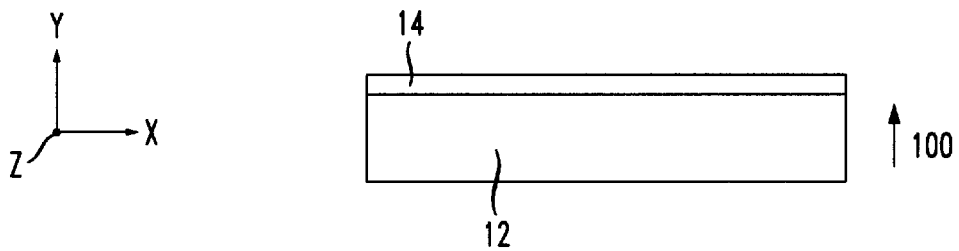
FIGS. 1 and 2 are side views representing successive steps in the preparation of a wafer that is processed to form multiple parts each of which constitutes a component of a micromachined variable capacitor made in accordance with the principles of the present invention.

Advantageously, the component parts of multiple variable capacitors embodying the principles of the present invention are made at the same time in a batch-fabrication process utilizing standard integrated-circuit processing techniques. Illustratively, the capacitor components are made in conventional single-crystal silicon wafers. A side view of one such wafer 12 is shown in FIG. 1. By way of example, the (100) crystalline axis of the wafer 12 is depicted as being oriented parallel to the indicated Y axis. One component part of each of a batch of multiple variable capacitors will be formed in the wafer 12 at the same time, as described in detail below.

In one specific illustrative embodiment, a layer 14 that will later serve as an etch-stop is established in the wafer 12 of FIG. 1. The layer 14 comprises, for example, a boron-rich region formed at and below the surface of the wafer 12 in a conventional implant or diffusion step. Illustratively, the boron concentration is selected to be about 1-to-9×10$^{19}$ atoms per cubic centimeter, and the Y-direction depth of the layer 14 is controlled to be approximately 0.5-to-2 micrometers ($\mu$m). As will be evident from the detailed description later below, the depth of the layer 14 determines the thickness of a flexible membrane to be micromachined in the wafer 12. In turn, the thickness of the membrane is important in designing the capacitance-versus-voltage characteristic of the resulting variable capacitor.

Figure 2:
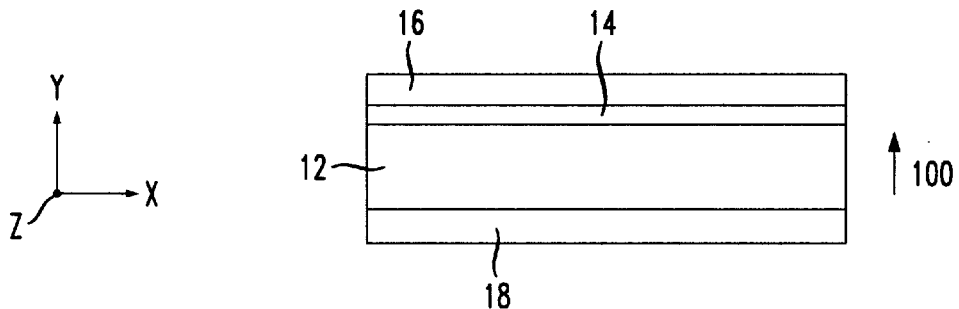

Subsequently, an insulating layer is formed on the top and bottom surfaces of the wafer 12. Illustratively, these layers are made of silicon dioxide (SiO$_2$) each having, for example, a Y-direction thickness of about 0.5-to-1 $\mu$m. FIG. 2 shows these top and bottom layers, which are designated by reference numerals 16 and 18, respectively.

To simplify the drawing and accompanying description, only one of the component parts of the batch of parts to be made in the wafer 12 of FIGS. 1 and 2 is actually shown in each of FIGS. 3 through 6. Similarly, later in connection with FIG. 7, another wafer from which the other component parts of the batch-fabricated variable capacitors are made will be described. But again for purposes of simplicity in presentation, only one of the multiple parts made in the FIG. 7 wafer is actually shown in FIGS. 8 through 10. Finally, in FIGS. 11 and 12, a component part made from the wafer 12 of FIGS. 1 and 2 and a component part made from the wafer of FIG. 7 are shown assembled to form a complete variable capacitor that embodies the principles of the present invention.

Figure 3:
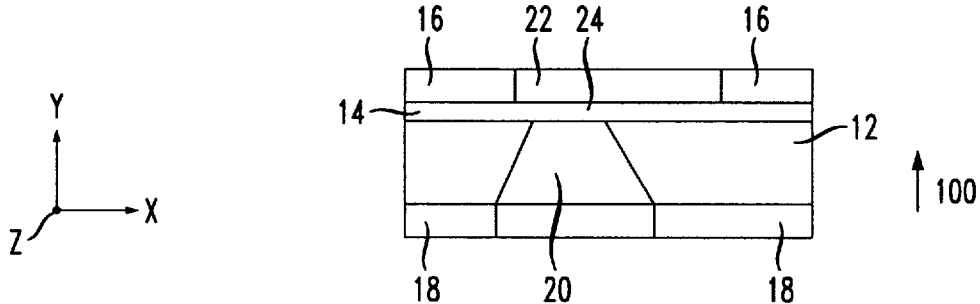
FIG. 3 is a side-view depiction of one such component part after further processing of the FIG. 2 wafer.

In accordance with the invention, the bottom SiO$_2$ layer 18 of FIG. 2 is patterned in conventional ways to expose a portion of the bottom surface of the silicon wafer 12. Subsequently, the exposed bottom of the wafer 12 is etched in a standard wet process utilizing, for example, ethylene diamine pyrocatechol (EDP) or potassium hydroxide. During this step, crystallographically dependent etching of the wafer 12 occurs, as is well known. As a result, a limited-depth hole 20 with slanted walls parallel to the (111) axes of the wafer 12 is thereby made in the wafer, as represented in FIG. 3. The depth of the hole 20 is limited by the boron-rich layer 14, which is substantially resistant to both of the specified wet etchants.

Additionally, the top SiO$_2$ layer 16 shown in FIG. 2 is patterned in a conventional way to establish an opening 22 therein. A portion of the top surface of the boron-rich layer 14 of the wafer 12 is thereby exposed. A side view of the opening 22 made in the layer 16 is shown in FIG. 3.

The aforedescribed patterning of the top and bottom SiO$_2$ layers 16 and 18 produces aligned openings 20 and 22, as represented in FIG. 3. In particular, the bottom hole 20 is positioned with respect to the top opening 22 such that the portion of the boron-rich layer 14 at the top of the etched hole 20 lies directly below and is encompassed within the perimeter of the top opening 22. This portion of the boron-rich layer 14 thus comprises a thin membrane 24 having no SiO$_2$ on its top surface and no undoped silicon on the bottom surface thereof By way of example, the aforespecified membrane 24 depicted in FIG. 3 has a Y-direction thickness of about 0.3-to-1.5 $\mu$m. In one specific illustrative example, the X and Z dimensions of the membrane 24 are each approximately 500 $\mu$m.

Figure 4:
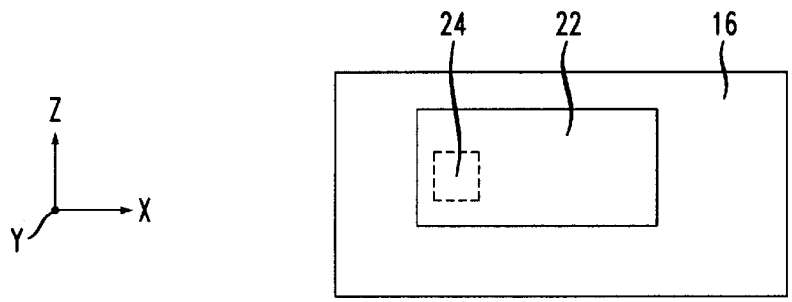
FIG. 4 is a top view of the FIG. 3 part.

FIG. 4 is a top view of the structure represented in FIG. 3. FIG. 4 thus shows the opening 22 in the top SiO$_2$ layer 16. The bottom surface of the opening 22 constitutes a portion of the top surface of the boron-rich silicon layer 14. All of that exposed bottom layer in the opening 22 is supported by the underlying wafer 12 except for the membrane portion 24 that directly overlies the hole 20. In FIG. 4, the membrane portion 24 at the top of the opening 22 is depicted in dash-line outline form, thereby showing the registration between the opening 22 and the membrane 24.

In accordance with the invention, a metal pattern is subsequently formed on the top surface of the component part represented in FIG. 4. This is done by utilizing a standard metal commonly used in integrated-circuit fabrication processes (for example, gold, aluminum, titanium, titanium nitride or tungsten) and by patterning the metal employing conventional integrated-circuit patterning techniques. As a result, two metal patterns 26 and 28 are thereby formed on the top surface of the FIG. 4 structure, as depicted in FIG. 5.

Figure 5:
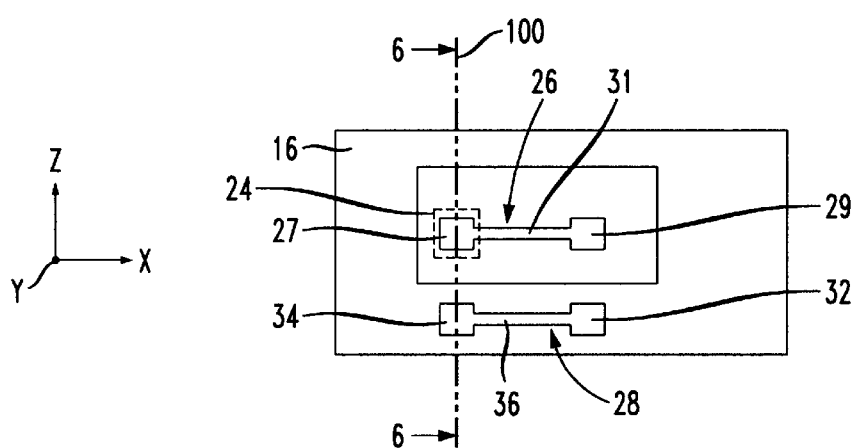
FIG. 5 shows the FIG. 4 part after delineation of a metal pattern thereon.

One of these metal patterns, designated by reference numeral 26 in FIG. 5, constitutes a left-hand portion 27 that overlies substantially the entirety of the thin membrane 24. In the final assembly (shown in FIGS. 11 and 12), the portion 27 comprises one plate of the variable capacitor. Further, the pattern 26 includes a bonding pad portion 29 and a connection 31 that extends between the portions 27 and 29. In the final assembly, an external electrical connection can be made to the bonding pad portion 29. Illustratively, the indicated metal pattern 26 has a Y-direction thickness of about 2-to-4 $\mu$m.

The metal pattern 28 shown in FIG. 5 also includes a bonding pad portion, which is designated by reference numeral 32. Further, the pattern 28 includes a portion 34 that is designed to make contact with a metal pattern included on the other component part of the variable capacitor described herein, which other part is specified in detail later below in connection with FIGS. 7 through 10. Additionally, an interconnecting portion 36 of the pattern 28 extends between the portions 32 and 34. Illustratively, the indicated metal pattern 28, which is formed on the top surface of the SiO$_2$ layer 16, has a Y-direction thickness of approximately 0.5-to-1 $\mu$m.

Figure 6:
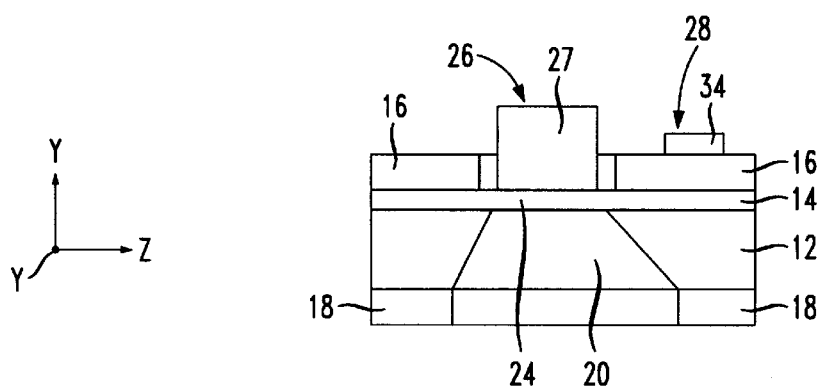
FIG. 6 is a side view of FIG. 5.
Figure 7:
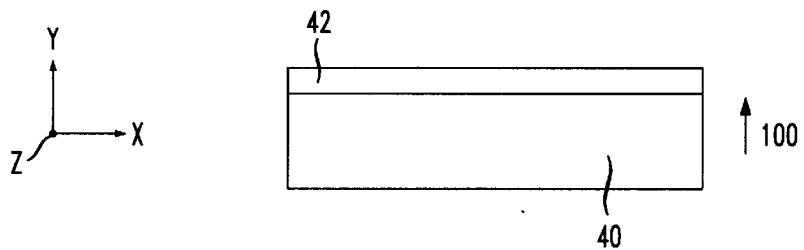
FIG. 7 is a side view of a second wafer that is processed to form multiple parts each of which constitutes a second component of a variable capacitor made in accordance with the present invention.

FIG. 6 is a cross-sectional side view of FIG. 5, as viewed in the direction of arrows 6 of FIG. 5 at reference line 100. FIG. 6 indicates that the metal patterns 26 and 28 have different thicknesses, as specified above. Also, FIG. 6 shows that the Z-direction width of the portion 27 of the metal pattern 26 covers substantially the entire Z-direction width of the flexible membrane 24.

Thus, as shown in FIGS. 5 and 6, the metal portion 27 that is supported by the thin membrane 24 constitutes one plate of a variable capacitor that embodies the principles of the present invention. And, as specified above, the membrane 24 comprises a boron-rich layer of silicon. Importantly, the thin flexible membrane 24 constitutes an integral part of and is mechanically supported by the wafer 12 from which it was micromachined.

Other ways of micromachining a wafer to form a thin flexible membrane therein are within the purview of the principles of the present invention. Thus, for example, it is feasible to omit the step depicted in FIG. 1 in which a boron-rich layer 14 is formed in the wafer 12. In that case, no etch-stop layer is provided in the wafer 12. Accordingly, etching to form a hole such as the hole 20 (FIG. 3) must then be carried out in a controlled fashion (for example, by controlling the time of etching). Such control can reliably ensure that a prespecified thickness of a portion of the wafer 12 will remain at the top of the hole 20 to serve as the aforespecified thin membrane. In that particular illustrative approach, the remaining membrane 24 thus comprises a thin layer of undoped single-crystal silicon.

In another alternative embodiment of the invention, the boron-doping step represented in FIG. 1 is again omitted, and the top surface of the wafer 12 is covered with a thin layer of an insulating or semi-insulating material such as silicon nitride or polysilicon. (For this case, reference numeral 14 can be considered to represent such a separate and distinct layer.) Etching to form the hole 20 (FIG. 3) is then carried out in standard ways, leaving in place the portion of the layer 14 at the top of the hole 20 to serve as a thin membrane on which a capacitor plate can subsequently be formed.

Also, a variety of standard etching techniques other than crystallographically dependent wet etching can be employed to form the hole 20 of FIG. 3. Thus, for example, a conventional anisotropic reactive-ion-etching (RIE) process can be employed to form such a hole through the patterned $SiO_2$ layer 18. Illustratively, by controlling the time of such an etching step, a vertically walled hole having a prespecified depth can be thereby made. In that alternative way, a wafer-supported thin membrane of the type specified herein can also be reliably fabricated.

As indicated above, the structure shown in FIG. 6 constitutes one component part of a variable capacitor made in accordance with the principles of the present invention. The fabrication of a mating component part designed to be combined with the FIG. 6 part to form a complete capacitor is described below in connection with FIGS. 7 through 10.

FIG. 7 is a side view of a wafer 40 made, for example, of single-crystal silicon. Illustratively, the (100) crystalline axis of the wafer 40 is oriented as indicated.

In accordance with the present invention, a layer 42 of $SiO_2$ is formed on the top surface of the wafer 40 of FIG. 7. The Y-direction thickness of the layer 42 is, for example, about 5-to-10 $\mu$m. The exact thickness that is selected for the layer 42 depends on the inter-plate air-gap distance desired in the final capacitor assembly, as will be evident from the detailed description later below.

Figure 8:
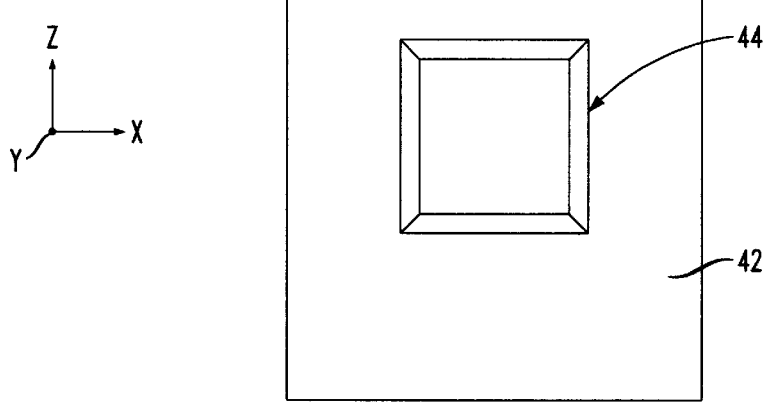
FIG. 8 is a top view of one such component after further processing of the FIG. 7 wafer.

Utilizing standard patterning and etching techniques, a through-opening or well 44 is then made in the $SiO_2$ layer 42 of FIG. 7. In this process, the layer 42 is advantageously etched with hydrofluoric acid, whereby a flat-bottomed well or recess with slanted walls is thereby formed, as represented in FIG. 8, which shows only one of the multiple parts made in the wafer 40. In one specific illustrative case, the X- and Z-direction extents of the bottom of the well 44 are each approximately 600 $\mu$m. The area of the bottom of the well 44 is thus, for example, slightly larger than the area of the earlier-described membrane 24 (FIG. 6).

Figure 9:
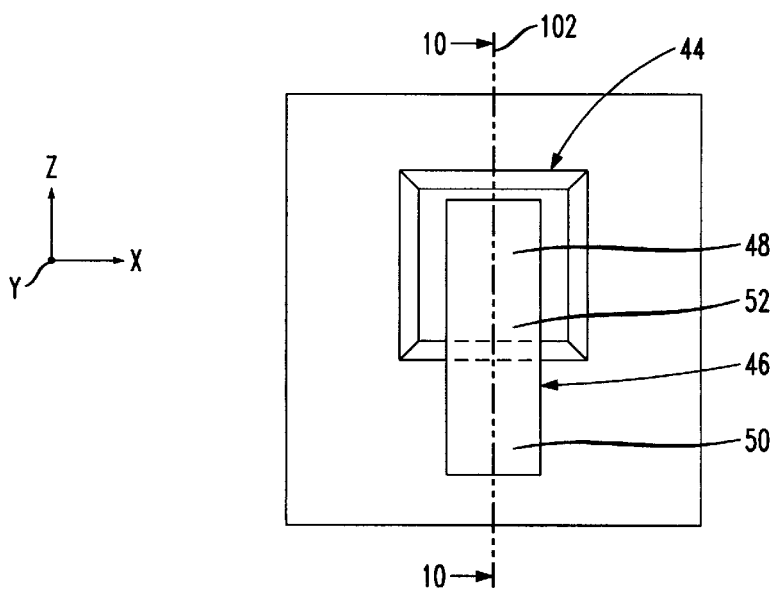
FIG. 9 shows the FIG. 8 component after formation of a metal pattern thereon.

Next, utilizing standard techniques, a metal pattern is formed on the top surface of the component part represented in FIG. 8. Such a pattern 46 is depicted in FIG. 9. In particular, the pattern 46 includes a portion 48 on the bottom of the well 44. In the final assembly, the portion 48 will constitute one plate of the herein-described variable capacitor. In practice, the portion 48 has substantially the same shape and area as the other previously specified capacitor plate (namely, the portion 27 of the metal pattern 26). Further, the pattern 46 of FIG. 9 also includes a portion 50 that in the final assembly is designed to make electrical contact with the portion 34 of the metal pattern 28 shown in FIGS. 5 and 6. Additionally, as indicated in FIG. 9, the end portions 48 and 50 of the metal pattern 46 are electrically interconnected by an intermediate portion 52, which comprises a metal layer that extends over one slanted wall of the well 44 and onto the top surface of the layer 42.

Figure 10:
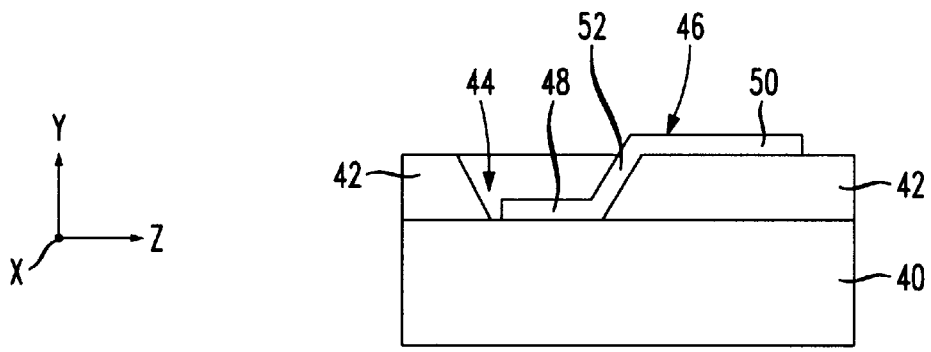
FIG. 10 is a side view of FIG. 9.

The aforedescribed illustrative component part represented in FIG. 9 is also shown in FIG. 10. FIG. 10 is a cross-sectional side view of the FIG. 9 part viewed in the direction of arrows 10 of FIG. 9 at reference line 102. By way of example, the Y-direction thickness of the metal pattern 46 shown in FIG. 10 is about 1-to-2 $\mu$m.

As mentioned above and as indicated in FIG. 10, the Y-direction depth of the well 44 formed in the $SiO_2$ layer 42 may extend down to the top surface of the wafer 40. In that case, the air-gap of the assembled capacitor that is shown in FIGS. 11 and 12 is equal to the depth of the well 44 less the combined thicknesses of the capacitor plate 27 (see FIGS. 5 and 6) and the capacitor plate 48 (see FIGS. 9 and 10).

The specific illustrative component parts described above and shown in FIGS. 5, 6 and 9, 10, respectively, are then assembled to form a variable capacitor that embodies the principles of the present invention. In particular, the part depicted in FIG. 9 is turned over and placed face down on the part represented in FIG. 5. The placement of the two parts with respect to each other is shown in FIG. 11.

Figure 11:
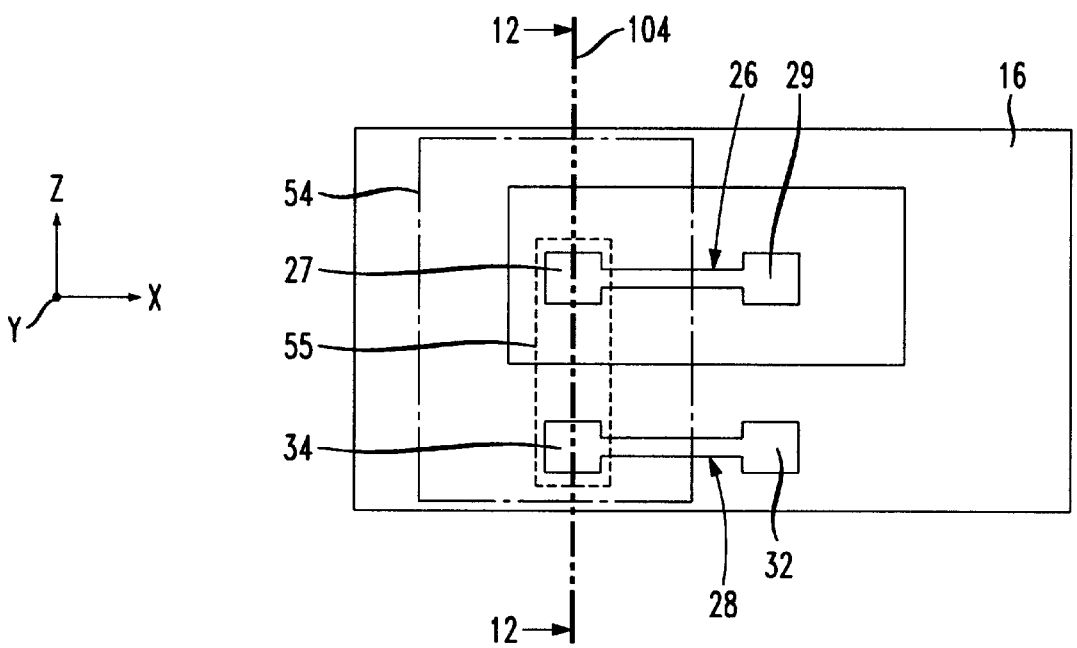
FIGS. 11 and 12 show the components of FIGS. 6 and 10 bonded together to form a specific illustrative variable capacitor made in accordance with the principles of this invention.
Figure 12:
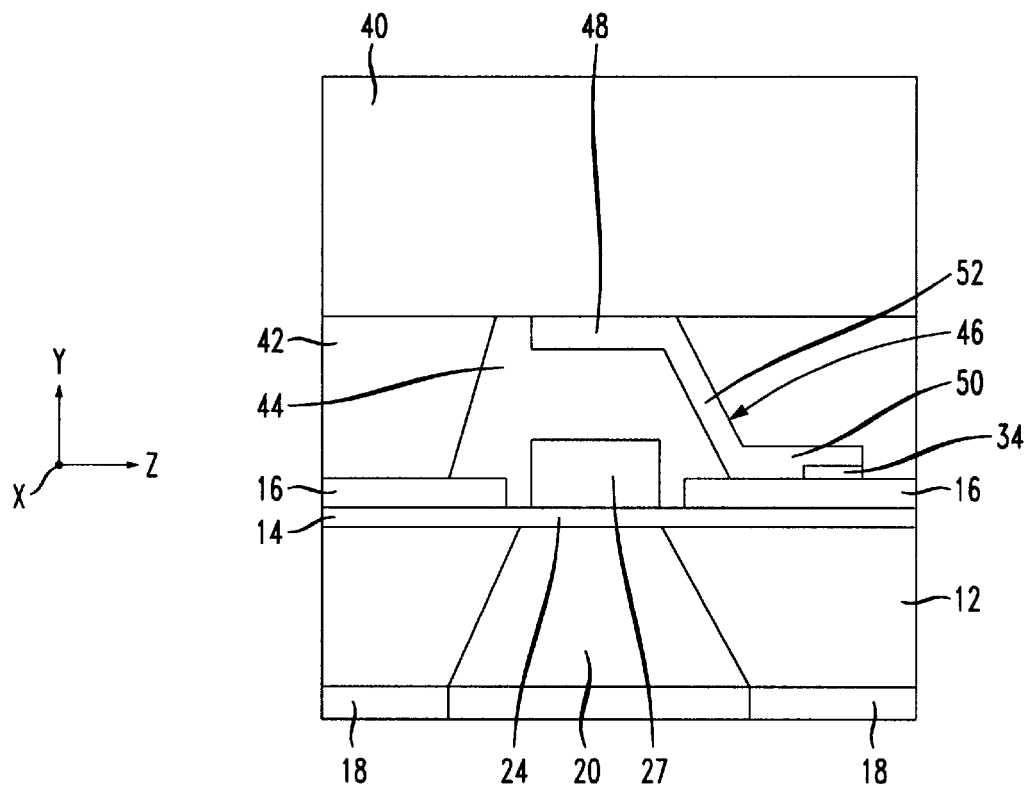

So as not to unduly clutter the drawing, FIG. 11 shows the entirety of the FIG. 5 representation of the first above-described component part but only a dot-dash outline 54 of the second above-described component part. Thus, the outline 54 indicates the face-down placement of the FIG. 9 part on the FIG. 5 part. Also, the metal pattern 46 (FIG. 9) on the underside of the second part 54 is approximated in FIG. 11 by dot-dash outline 55.

The design of the aforespecified first and second component parts is such that when they are assembled in the particular manner indicated in FIG. 11, the metal-capacitor-plate portion 48 (FIG. 9) of the second component part directly overlies and is spaced apart from the metal-capacitor-plate portion 27 (FIG. 11) of the first component part. Moreover, in the FIG. 11 assembly, the end portion 50 of the metal pattern 46 of the FIG. 9 component directly overlies and contacts the left-hand portion 34 of the metal pattern 28 of the FIG. 5 component. Accordingly, when electrical leads (not shown) are respectively connected to the bonding pad portions 29 and 32 of the metal patterns 26 and 28 of FIG. 11, external electrical connections are thereby made to the metal capacitor plates 27 and 48 of the herein-described capacitor.

In accordance with the invention, the two aforespecified component parts are attached to each other to form the assembly represented in FIG. 11. Various known bonding techniques for accomplishing this are known. Advantageously, such attachment is carried out in a conventional thermo-anodic bonding process. A standard thermo-anodic bonding process is described, for example, by Wallis and Pomerantz in "Field-Assisted Glass-Metal Sealing", *J. of App. Phys.*, Vol. 40, pages 3946–3949, 1969. By employing such a process, a strong mechanical bond is established between contacting $SiO_2$ surfaces of the two assembled component parts. Wherever intervening metal pattern portions exist on the $SiO_2$ surfaces, $SiO_2$ material flows around the metal portions during the bonding step to allow good $SiO2$-to-$SiO_2$ mechanical connections to be established. At the same time, good mechanical and electrical connections are made between any metal pattern portions of the two component parts that contact each other during the bonding process. Thus, during assembly of the component parts, the metal portion 34 shown in FIG. 11 is mechanically bonded and electrically connected to the metal portion 50 depicted in FIGS. 9 and 10.

FIG. 12 is a side view of the assembly represented in FIG. 11. In particular, FIG. 12 is a cross-sectional side view taken in the direction of arrows 12 of FIG. 11 at reference line 104.

In the assembly of FIG. 12, the metal capacitor plate 27 supported by the thin membrane 24 of the first or lower component part is shown spaced apart from the metal capacitor plate 48 that is included on the second or upper component part. Also, FIG. 12 depicts the electrical connection (the metal portion 52) that extends between the upper capacitor plate 48 and the portion 34 of the metal pattern 28 on the lower component part.

To achieve variation of the capacitance of the micromachined capacitor represented in FIGS. 11 and 12, alternating- or direct-current control signals are applied to electrical leads connected to the pads 29 and 32 (FIG. 11). In response thereto, due to electrostatic-attraction effects, the metal plates 27 and 48 are attracted toward each other. The upper plate 48 is mounted on a stable base and is thus not free to move. But the lower plate 27, which is mounted on the thin membrane 24, is free to move over a limited distance due to flexure of the membrane 24. As a result, the lower plate 27 is moved upward in response to applied control signals. The amount of the upward movement is a direct function of the magnitude of the applied control voltage. In that way, the capacitance of the structure can be varied in an electrically controlled way.

Alternatively, the thin membrane 24 shown in FIGS. 11 and 12 can be flexed and moved upward in other ways. Thus, for example, a piezoelectric element may be attached to the bottom of the membrane 24 and electrically controlled to cause movement of the membrane, and thus of the capacitor plate 27, upward toward the capacitor plate 48. Such an element is schematically depicted in FIG. 13 wherein it is identified by reference numeral 60.

In a so-called two-port embodiment of the invention, as described above, wherein signal and control signals are applied to the same pair of plates, care must be taken in operation to limit the extent to which the original plate-to-plate air-gap distance is decreased. In particular, when the air gap is decreased to about two-thirds of the original distance, instability may occur. In practice, at that point the electrostatically-attracted plates may actually snap together. Avoiding such instability thus imposes a practical limit on the range over which the capacitance of a two-port capacitor structure may be varied.

In a specific illustrative embodiment of the principles of the present invention, the aforementioned instability problem is overcome. This is done by providing each variable capacitor with two pairs of plates, as represented in FIG. 13. Thus, FIG. 13 includes four metal plates 61 through 64. The two relatively widely spaced-apart facing plates 61 and 62 constitute control plates, whereas the two relatively narrowly spaced-apart facing plates 63 and 64 constitute the actual capacitor or signal-carrying plates of the depicted assembly. As shown, the metal plates 62 and 64 are supported by the thin membrane 24, and the metal plates 61 and 63 are supported by the wafer 40.

Figure 13:
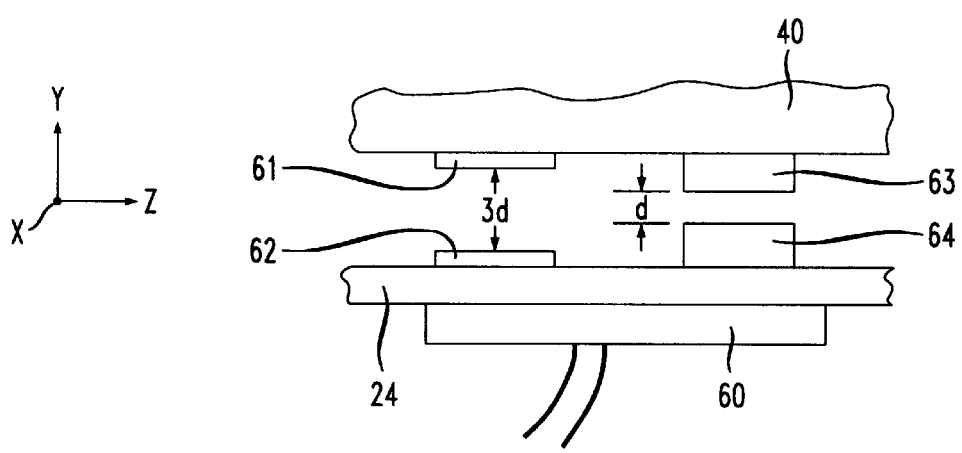
FIG. 13 shows a portion of an embodiment of the present invention in which separate control and signal plates are employed.

By way of a particular illustrative example, the Y-direction separation between the control plates 61 and 62 is advantageously chosen to be about 3 d, and the separation between the capacitor plates 63 and 64 is selected to be only approximately d, as indicated in FIG. 13. In operation, electrostatic attraction between the plates 61 and 62 and flexure of the membrane 24 occur. By ensuring that the air-gap between the control plates 61 and 62 is not allowed to become less than 2 d, no snapping together of the the control plates 61 and 62 takes place. In other words, by constraining Y-direction movement of the control plates 61 and 62 to be approximately equal to or less than the distance d, instability of operation is avoided. At the same time, this stable allowable range of movement (the distance d) permits the capacitor plates 63 and 64 to be moved to have any air-gap separation that is desired. In such a structure, the maximum possible capacitance variation is thus made possible between the plates 63 and 64.

Hence, in accordance with the principles of the present invention, a micromachined variable capacitor is provided. The capacitor is amenable to batch fabrication utilizing standard integrated-circuit manufacturing techniques. The fabrication process for the capacitor is thus compatible with processes employed to make other integrated-circuit structures such as millimeter waveguide assemblies. The resulting capacitor is a relatively low-cost element exhibiting reliability, a high Q, reproducibility and a linear capacitance-versus-voltage characteristic. Further, the element is tunable over a relatively wide range and is adapted for use in various high-frequency applications. Illustratively, in accordance with one specific embodiment of the invention, a variable capacitor suitable for operation in the gigaHertz range, exhibiting a Q greater than 1000 and having a capacitance range of approximately 0.1-to-5 picoFarads is provided.

Finally, it is to be understood that the above-described arrangements and techniques are only illustrative of the principles of the present invention. In accordance with these principles, numerous modifications and alternatives may be devised by those skilled in the art without departing from the spirit and scope of the invention.

What is claimed is:

1. A variable capacitor comprising
   a first wafer having a main planar surface,
   a single-layer flexible membrane formed integral with said wafer and mechanically supported by said wafer only along the entire periphery of said membrane, the surface of said membrane comprising a portion of said main planar surface,
   a first metal capacitor plate on the surface of said flexible membrane,
   a second wafer having a main planar surface,
   a well in the surface of said second wafer,
   a second metal capacitor plate in said well,
   said first and second wafers being bonded together such that the respective main planar surfaces thereof face each other and said first and second capacitor plates are in alignment with each other with an air-gap therebetween,
   and metal patterns on said first and second wafers respectively connected to said first and second plates to provide bonding pads for electrical connections to said plates,
   wherein said first wafer comprises single-crystal silicon, the surface of said silicon wafer constituting the main planar surface of said first wafer.

2. A capacitor as in claim 1 wherein said flexible membrane comprises doped single-crystal silicon.

3. A capacitor as in claim 1 wherein said flexible membrane comprises undoped single-crystal silicon.

4. A variable capacitor comprising
   a first wafer having a main planar surface,
   a flexible membrane formed integral with said wafer and mechanically supported by said wafer only along the entire periphery of said membrane, the surface of said membrane comprising a portion of said main planar surface,
   a first metal capacitor plate on the surface of said flexible membrane, a second wafer having a main planar surface, a well in the surface of said second wafer, a second metal capacitor plate in said well, said first and second wafers being bonded together such that the respective main planar surfaces thereof face each other and said first and second capacitor plates are in alignment with each other with an air-gap therebetween, and metal patterns on said first and second wafers respectively connected to said first and second plates to provide bonding pads for electrical connections to said plates, and further including a patterned layer of silicon dioxide on the main planar surface of said first wafer, said silicon dioxide pattern including a recess therein that surrounds and is larger than said flexible membrane.

5. A capacitor as in claim 4 wherein the metal pattern on said first wafer includes a first portion within said recess connected to said first plate and a second separate and distinct portion on the surface of said layer of silicon dioxide.

6. A variable capacitor comprising a first wafer having a main planar surface, a flexible membrane formed integral with said wafer and mechanically supported by said wafer only along the entire periphery of said membrane, the surface of said membrane comprising a portion of said main planar surface, a first metal capacitor plate on the surface of said flexible membrane, a second wafer having a main planar surface, a well in the surface of said second wafer, a second metal capacitor plate in said well, said first and second wafers being bonded together such that the respective main planar surfaces thereof face each other and said first and second capacitor plates are in alignment with each other with an air-gap therebetween, and metal patterns on said first and second wafers respectively connected to said first and second plates to provide bonding pads for electrical connections to said plates, and wherein said second wafer comprises a wafer having a layer of silicon dioxide on the surface of said wafer, the main surface of said layer of silicon dioxide constituting the main planar surface of said second wafer, and wherein said well is formed in said layer of silicon dioxide of said second wafer.

7. A capacitor as in claim 6 wherein said well includes slanted side walls.

8. A capacitor as in claim 7 wherein the metal pattern on said second wafer includes a portion connected to the second capacitor plate in said well, said portion being formed on the surface of said layer of silicon dioxide and extending over one of said side walls to connect to said second capacitor plate.

9. A capacitor as in claim 8 wherein the second portion of the metal pattern on said first wafer and the portion of the metal pattern on said second wafer that is on the surface of said layer of silicon dioxide comprise electrical connections to said capacitor.

10. A capacitor as in claim 9 wherein said first and second wafers are bonded together in a thermo-anodic bonding step.

11. A variable capacitor comprising a first wafer having a main planar surface, a flexible membrane formed integral with said wafer and mechanically supported by said wafer only along the entire periphery of said membrane, the surface of said membrane comprising a portion of said main planar surface, a first metal capacitor plate on the surface of said flexible membrane, a second wafer having a main planar surface, a well in the surface of said second wafer, a second metal capacitor plate in said well, said first and second wafers being bonded together such that the respective main planar surfaces thereof face each other and said first and second capacitor plates are in alignment with each other with an air-gap therebetween, and metal patterns on said first and second wafers respectively connected to said first and second plates to provide bonding pads for electrical connections to said plates, wherein an additional separate and distinct pair of facing spaced-apart metal plates are respectively formed on the surface of said flexible membane and in said well, the air-gap distance between said separate and distinct pair of plates being greater than the air-gap distance between the first and second capacitor plates, said additional pair of facing plates comprising the sole control instrumentality by which said flexible membrane is moved by electrostatic attraction to vary the distance and thus the capacitance between said first and second capacitor plates.

12. A capacitor as in claim 11 wherein the air-gap distance between said separate and distinct pair of plates is at least approximately three times greater than the air-gap distance between said first and second capacitor plates, and wherein movement of said additional pair of facing plates due to electrostatic attraction therebetween is limited to a distance approximately equal to or less than the maximum quiescent air-gap distance between said first and second capacitor plates, whereby instability of operation of said additional pair of facing plates is avoided while at the same time stable operation of the first and second capacitor plates over any air-gap separation therebetween is thereby ensured.

* * * * *